(12) United States Patent
Warren et al.

(10) Patent No.: US 11,708,932 B2
(45) Date of Patent: *Jul. 25, 2023

(54) PIPE LINING PREPARATION ASSEMBLY

(71) Applicant: LIQUI-FORCE SERVICES (ONTARIO) INC., Kingsville (CA)

(72) Inventors: Darcy Warren, Essex (CA); Ron Bartel, Wheatley (CA); Steve Bartel, Ruthven (CA)

(73) Assignee: LIQUI-FORCE SERVICES (ONTARIO) INC., Kingsville (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/829,716

(22) Filed: Jun. 1, 2022

(65) Prior Publication Data

US 2022/0290795 A1   Sep. 15, 2022

Related U.S. Application Data

(63) Continuation of application No. 13/576,221, filed as application No. PCT/CA2011/000857 on Jul. 28, 2011, now Pat. No. 11,378,219.

(60) Provisional application No. 61/370,833, filed on Aug. 5, 2010.

(51) Int. Cl.
*F16L 55/18* (2006.01)
*B08B 9/049* (2006.01)
*E03F 7/12* (2006.01)

(52) U.S. Cl.
CPC ............ *F16L 55/18* (2013.01); *B08B 9/0492* (2013.01); *E03F 7/12* (2013.01)

(58) Field of Classification Search
CPC ...... G01M 3/005; G01M 3/38; G01N 21/954; E03F 7/12; H04N 7/183; F16L 55/18; B08B 9/0492

USPC ..................................................... 348/84–85
See application file for complete search history.

(56) References Cited

U.S. PATENT DOCUMENTS

| | | | |
|---|---|---|---|
| 4,411,178 A | 10/1983 | Wachs et al. | |
| 4,677,472 A | 6/1987 | Wood | |
| 5,018,545 A | 5/1991 | Wells | |
| 5,309,947 A * | 5/1994 | Hinger | E03F 3/06 118/306 |
| 5,571,977 A | 11/1996 | Kipp | |
| 5,956,135 A * | 9/1999 | Quesnel | G01M 3/38 138/97 |
| 5,992,247 A * | 11/1999 | Manestar | G01M 3/38 73/865.8 |
| 6,887,014 B2 | 5/2005 | Holland | |

(Continued)

FOREIGN PATENT DOCUMENTS

| | | |
|---|---|---|
| CA | 2477063 A1 | 2/2005 |
| CA | 2309018 A1 | 11/2011 |

OTHER PUBLICATIONS

International Search Report and Written Opinion for PCT Application No. PCT/CA2011/000857 dated Aug. 25, 2011.

*Primary Examiner* — Tung T Vo
(74) *Attorney, Agent, or Firm* — Carlson, Gaskey & Olds, P.C.

(57) ABSTRACT

An example sewer preparation from the main (PFM) device provides for the inspection and preparation of the sewer pipe from the main sewer pipe. The PFM device provides for the insertion of one or more individual and separately controllable tools into the sewer pipe. The tools include a clean out tool and a camera.

19 Claims, 8 Drawing Sheets

(56) References Cited

U.S. PATENT DOCUMENTS

| | | |
|---|---|---|
| 7,073,979 B2 | 7/2006 | McGrew et al. |
| 9,964,250 B2 * | 5/2018 | Lewis, Sr. ................. B08B 9/04 |
| 2002/0166396 A1 * | 11/2002 | McGrew ............... G01M 3/005 |
| | | 73/865.8 |
| 2008/0021662 A1 * | 1/2008 | Hinn ..................... G01M 3/005 |
| | | 702/34 |

* cited by examiner

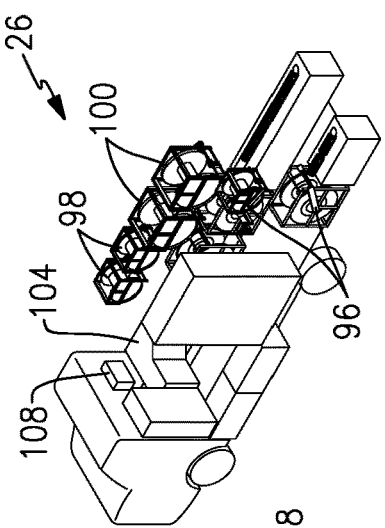
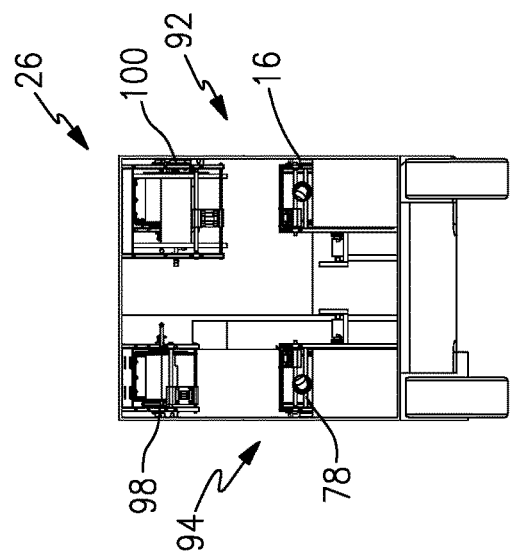
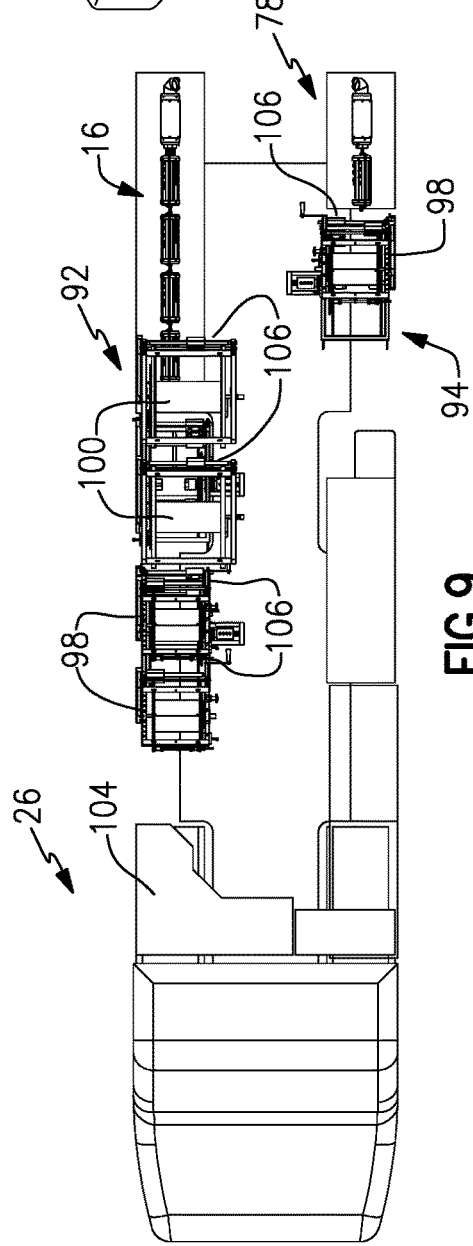
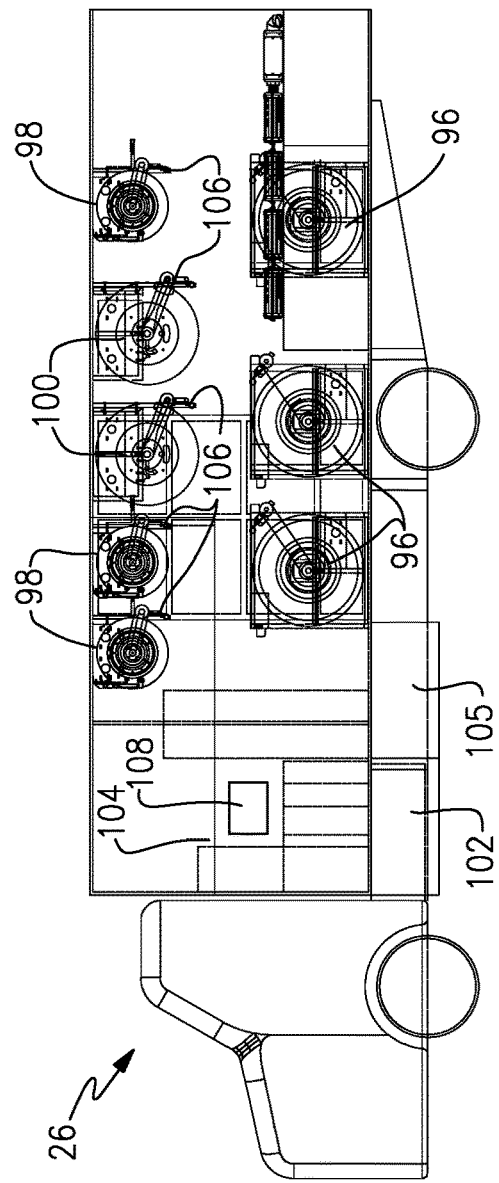

PIPE LINING PREPARATION ASSEMBLY

CROSS REFERENCE TO RELATED APPLICATION

This application is a continuation of U.S. application Ser. No. 13/576,221 filed Jul. 31, 2012 that is a National Phase application of International Application No. PCT/CA2011/000857 filed Jul. 28, 2011 that claims priority to Provisional Application No. 61/370,833 which was filed on Aug. 5, 2010.

BACKGROUND

This disclosure generally relates to a device for preparing and measuring a sewer pipe prior to installation of a cured in place pipe lining.

A cured in place pipe lining method utilizes a resin soaked liner that is installed within a sewer. The resin soaked liner is forced against the inner walls of a sewer with fluid or mechanical pressure until cured. Once cured the liner becomes a new pipe within the original pipe. The resin soaked liner is custom tailored to the particular sewer pipe to match diameter and length requirements. Accordingly, prior to installation, the old sewer pipe is cleaned and measured. Cleaning can require cutting away debris such as roots and other accumulations that impede desired fluid flow. Measurements such as the pipe diameter are required for the entire desired length of lining. Further, in many instances a video inspection of the sewer is required to contrast the original and repaired state of the sewer pipe.

Cleaning, measuring and videoing the interior of a sewer pipe are complicated due to the confined environment and limited accessibility. In many instances a service lateral pipe leading from a building or home into a larger main sewer pipe is the pipe in most need of repair. However, such sewer pipe connections can be the most difficult to access. Access is typically available from the main sewer pipe, and from the home or building. It is undesirable to access through the home, and difficult to gain access through the main. In some instances, a secondary pipe referred to as a clean out is installed to provide access to the lateral sewer pipe. This is also undesirable as installation of a clean out often requires digging in a home owner's front yard at additional cost and time.

SUMMARY

A disclosed sewer preparation from the main (PFM) device provides for the inspection and preparation of the sewer pipe from the main sewer pipe. The PFM device provides for the insertion of one or more individual and separately controllable tools into the sewer pipe. The tools include a clean out tool and a camera. Each of the tools is controlled separately such that each tool can be inserted and retracted from the lateral as desired.

The PFM device is controlled through support lines that originate from a support vehicle. The PFM device is moved into place by a tow machine that includes camera that is controlled from the support vehicle. The support vehicle includes equipment to control movement of the tools and for viewing images provided by the camera. The control conduits and support lines include hydraulic conduits, water hoses, electrical communication conduits along with any other required control, or supply lines that are required to operate the tools.

These and other features disclosed herein can be best understood from the following specification and drawings, the following of which is a brief description.

BRIEF DESCRIPTION OF THE DRAWINGS

FIG. 8 is a side schematic view of an example support vehicle.

FIG. 9 is a top schematic view of the example support vehicle.

FIG. 10 is a rear schematic view of the example support vehicle.

FIG. 11 is a perspective view of the example support vehicle.

DETAILED DESCRIPTION

Figure 1:
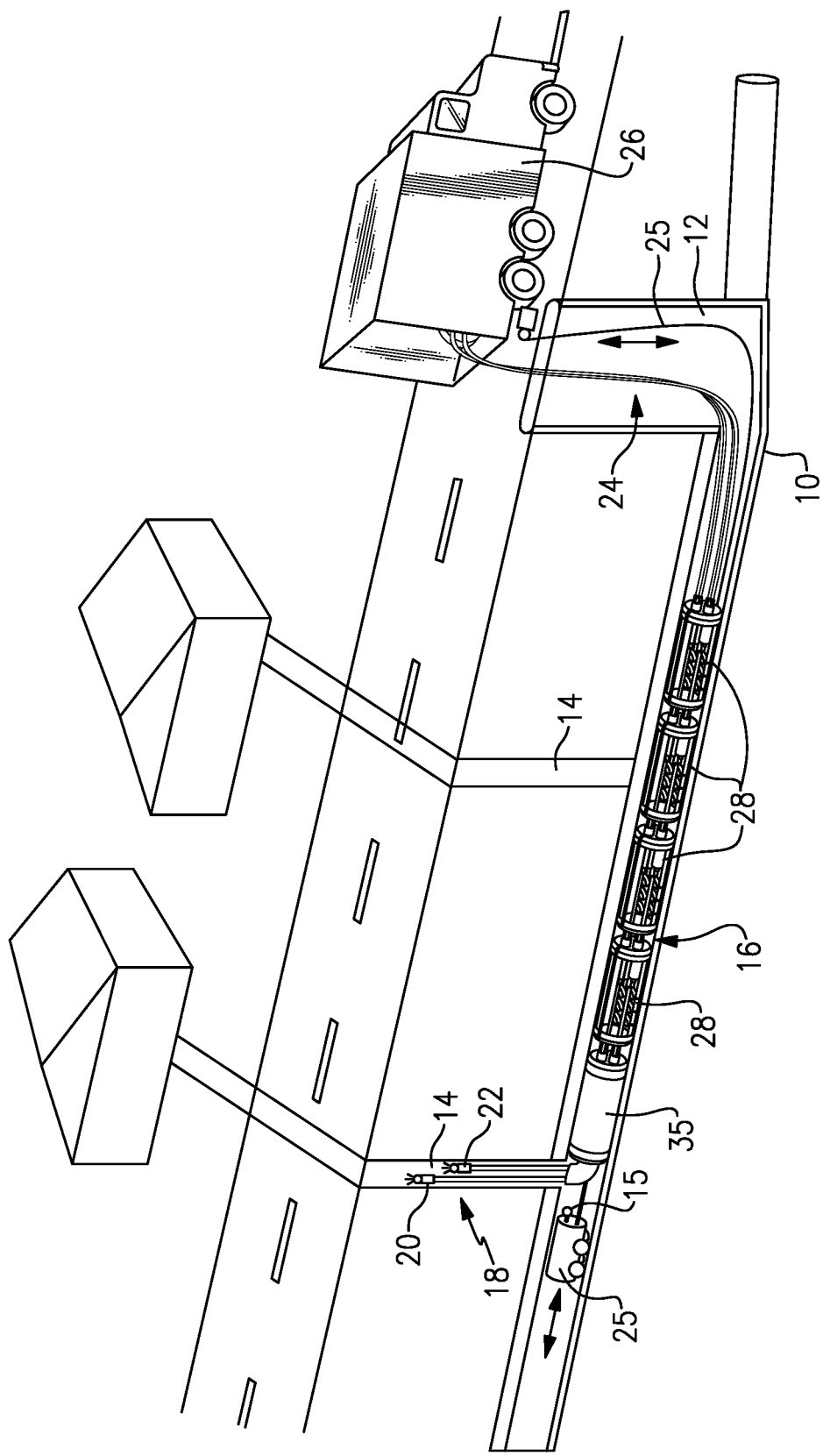
FIG. 1 is a schematic view of an example sewer system and preparation from the main device.

Referring to FIG. 1, an example sewer system is schematically shown and includes several service lateral sewer pipes 14 that lead into one common main sewer pipe 10. Access to the main pipe 10 is provided through a manhole 12. Each of the laterals 14 lead to a residence or building. One method of repairing aged sewer lines requires digging and replacement. A less intrusive method referred to as a cured in place pipe (CIPP) method that utilizes a resin impregnated liner that is inserted and held in place until cured to form a new pipe within the old pipe. The use of the CIPP method does not require excavation and is therefore preferred for many repairs. However, the sewer pipes must be clear of debris and other intrusions such as plant roots that clog and constrict fluid flow.

A disclosed example preparation from the main (PFM) device 16 provides for the inspection and preparation of the lateral sewer pipe 14 from the main sewer pipe 10. The example PFM device 16 provides for the insertion of one or more individual and separately controllable tools 18 into the lateral sewer pipe 14. The example tools 18 include a clean out tool 20 and a camera 22. Each of the tools 20, 22 are controlled separately such that each tool can be inserted into the lateral 14 as desired.

The PFM device 16 is controlled through support lines generally indicated at 24 that originate from a support vehicle 26. Further, the PFM device 16 is moved into place by a tow machine 25 that includes camera 15. The example to machine 25 can be controlled from within the support vehicle 26, or by another remotely located control device. The support vehicle 26 includes equipment to control movement of the tools and for viewing images provided by the camera 22. The support lines 24 include hydraulic conduits, water hoses, electrical communication conduits along with any other required control, or supply lines that are required to operate the tools 18.

As appreciated, although the disclosed example PFM device 16 relies on a tow machine 25, it is within the contemplation of this disclosure to include a drive system as part of the PFM device 16 such that is self-propelled. In such an example device, the PFM device 16 would include a drive system for moving through the main pipe 10. The drive system (not shown) would be controlled by an operating within the support vehicle 26. Moreover, the PFM device 16 could also be dragged into place by a winch system that pulls the PFM through the main 10 to a desired position. In both the self-powered and the winch positioned systems, the positioning camera 15 would be supported on the PFM device 16 to provide images utilized to indicate a position and align the PFM device 16 with a lateral 14.

Figure 2:
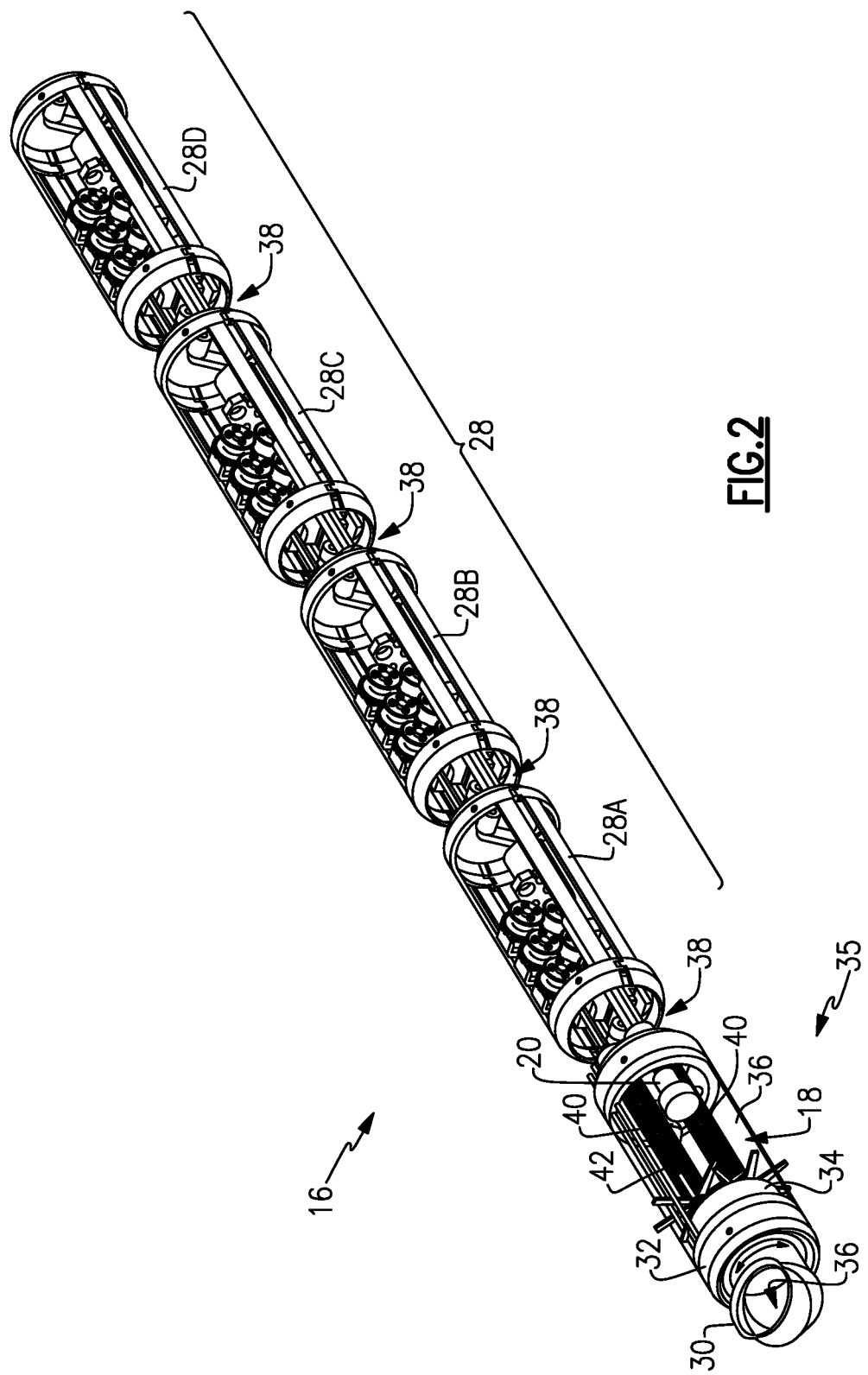
FIG. 2 is a perspective view of an example preparation from the main device.

Referring to FIG. 2, the example PFM device 16 includes multiple driver modules 28 for moving each of the tools 18 within the sewer pipe 14. Each of the driver modules 28 drive one of the tools 18 that is stored in a launch head 35. In this example, four driver modules 28 are shown and four separate tools 18 are operable from the PFM 10.

In this description, when referring to all of the driver modules the reference numeral 28 will be utilized and when referring to specific one of the driver modules 28, the appropriate reference numeral 28A, 28B, 28C, and 28D will be utilized. Moreover, corresponding features in each of the driver modules 28 will also be referred to generally by the reference number without a letter, and to a specific feature corresponding with the letter corresponding to that driver module 28.

The launch head 35 is coupled to the front of the driver modules 28 and includes a snout 30. The snout 30 is mounted to a rotatable collar 32. A hydraulic motor 34 drives rotation of the collar 32 to position an opening 36 in the snout 30 with the opening of the lateral sewer pipe 14.

The launch head 35 includes an interior space 36 where the tools 18 are stored when not in use. The snout 30 defines a passage through which the tools 18 exit the launcher head 35 and move through the lateral 14.

The launch head 35 and each of the modules 28 are linked together by couplings 38. The couplings 38 provide a flexible connection between each of the driver modules 28 and the launcher head 35. The flexible connection provided by the couplings 38 provides articulating relative movement between each of the driver modules 28 and the launcher head 35. The resulting articulating movement aids in moving the PFM device 16 through the manhole 12 and into position within the main sewer pipe 10.

Figure 3:
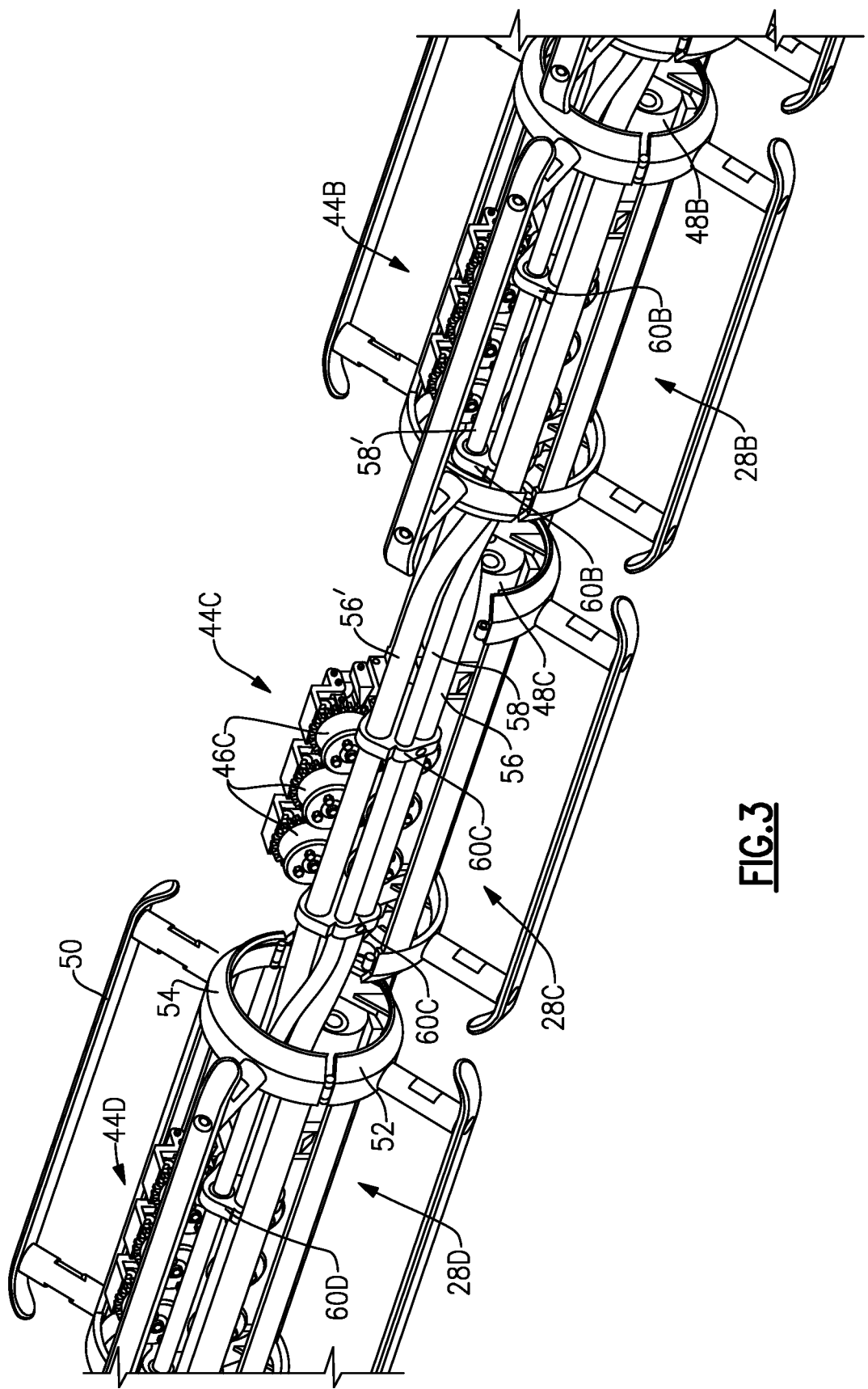
FIG. 3 is a perspective view of a portion of the example preparation from the main device.

Referring to FIG. 3 with continued reference to FIG. 2, the tools 18 are attached to an end of a corresponding cable or hose that runs through each of the proceeding driver modules 28 and back to the support vehicle 26. In this example, the tools 18 include a first water powered tool 20, a first camera 22, a second water powered tool 40 and a second camera 42. Each of the water powered tools 20 and 40 are attached to the end of a corresponding water hose 56. Each of the cameras 22, 42 are attached to the end of a cable 58 including the required electrical connections to illuminate the interior of the sewer pipe 14 and to transmit images back to a display within the support vehicle 26. The specific configuration of the water tools 20, 40 is determined by the application specific requirements.

A drive assembly 44 is mounted within each of the driver modules 28 for driving each of the hoses 56 and cables 58 thereby driving the tools 18 out through the snout 30 and into the sewer pipe 14. The drive assembly 44 includes drive wheels 46 that are driven by a motor 48. The example motor 48 is hydraulically driven. Accordingly, the control cables 24 leading into the support vehicle 26 include hydraulic lines that supply a pressurized flow of hydraulic fluid to each of the motors 48. Each of the hoses 56 and cables 58 are threaded through a corresponding set of the drive wheels 46 within one of the driver modules 28. In other words, each of the water hoses 26 runs through one set of drive wheels 46. For example, one water hose 56 runs through the driver wheels in the first module 28A and a second water hose run through the driver wheels 46 in the second driver module 28B. The first cable 58 runs through driver wheels in the third driver module 28C and the second cable 58 runs through driver wheels in the fourth driver module 28D.

Figure 4:
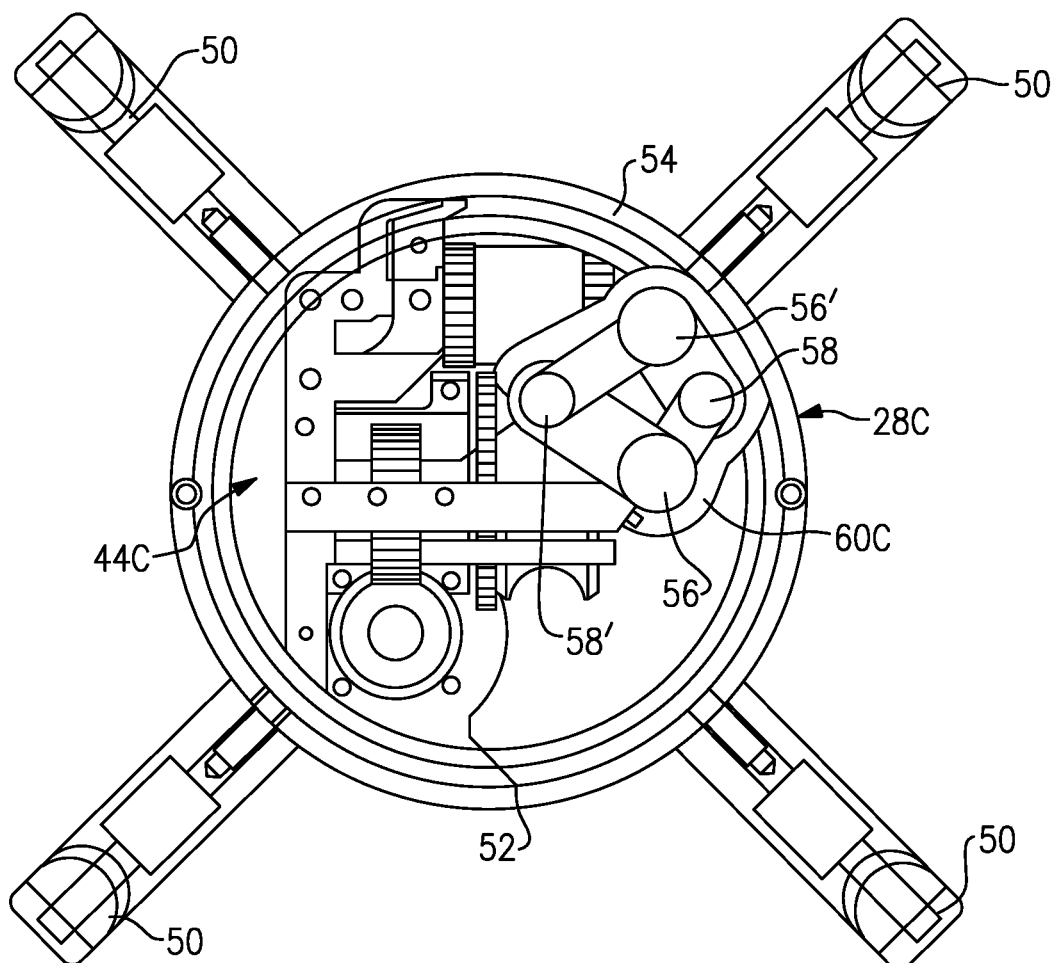
FIG. 4 is a cross-sectional view of an example driver module.

Referring to FIG. 4 with continued reference to FIG. 3, the hoses 56 and cables 58 are routed through a guide bracket 60 mounted adjacent each drive assembly 44. The guide bracket 60 routes each of the houses 56 and cables 58 through each of the driver modules 28 such that each one is routed through a set of driver wheels 46. The hose 56 or cable 58 that is not being driven by that specific driver module 28 move beside the driver wheels 46 through corresponding openings in the guide bracket 60.

FIG. 4 shows the third driver module 28C that drives the cable 58'. The remaining hoses 56, 56' and cable 58 are guided through the guide bracket 60C next to the driver wheels 44 through the third driver module 28C toward the launcher head 35. Once through the third driver module 28C, the cable 58' driven in the third driver module 28C is routed such that it extends through an opening in the guide bracket 60 of the next driver module such that it is not routed through the next drive assembly. Another of the hoses 56 or cables 58 is then routed through the drive assembly of the next driver module that in this example is the driver module 28B. Accordingly, each of the hoses 56 and cables 58 are subsequently guided through drive wheels 46 of one of the driver modules 28.

Referring to FIGS. 2 and 3, each of the driver modules 28 includes a cylindrical housing having an upper case 54 and a lower case 52. The upper case 54 is removable to provide access to the drive assembly 44 mounted within the driver module 28. Skids 50 extend from the upper and lower cases 52, 54 and provide for supporting of each of the drive modules 28 within the main sewer 10. The length that the skids 50 extend form the driver module 28 is adapted to the inner diameter of the main sewer 10.

Figure 5:
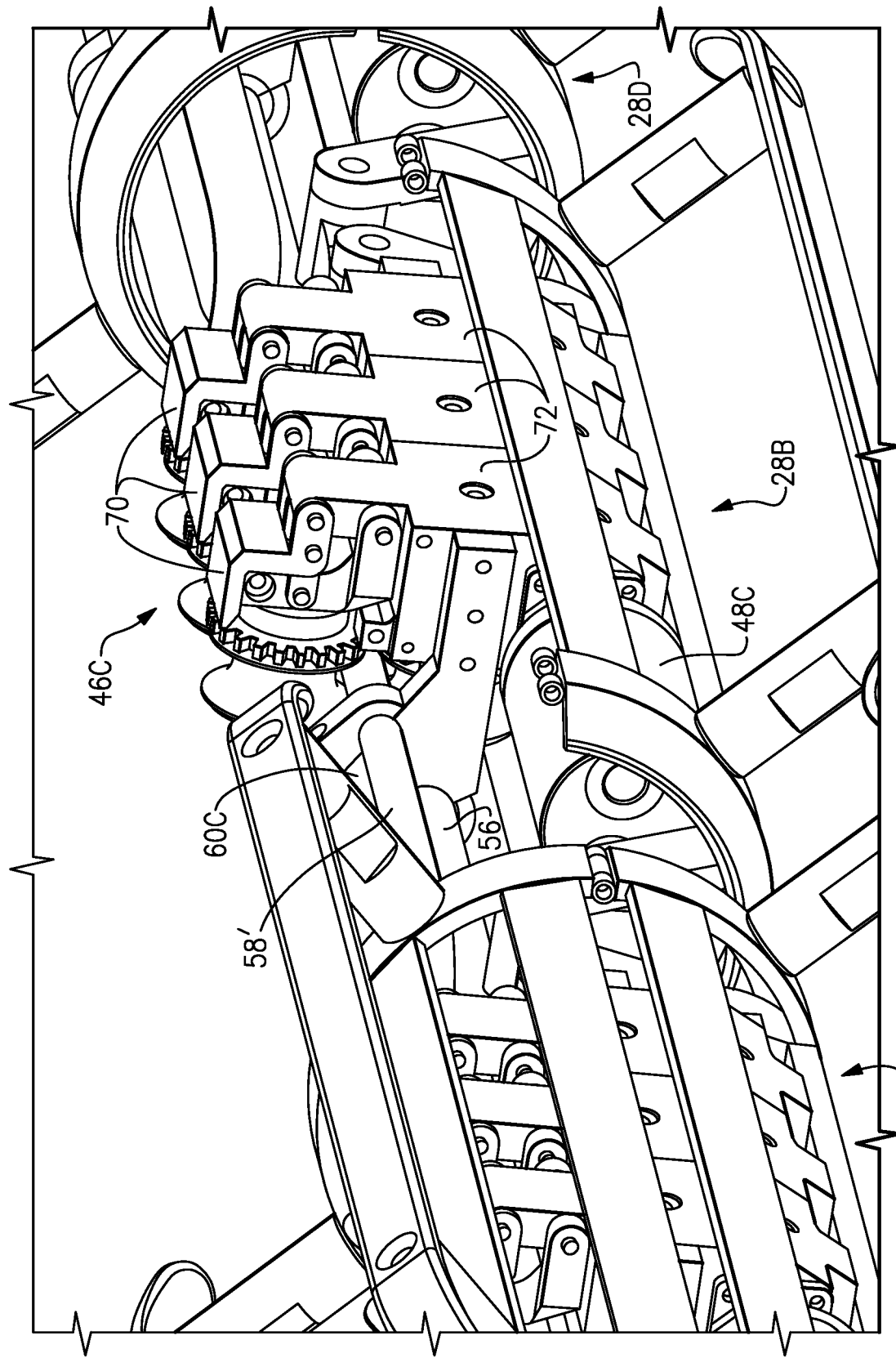
FIG. 5 is a perspective view of an example drive assembly mounted within a driver module.
Figure 6:
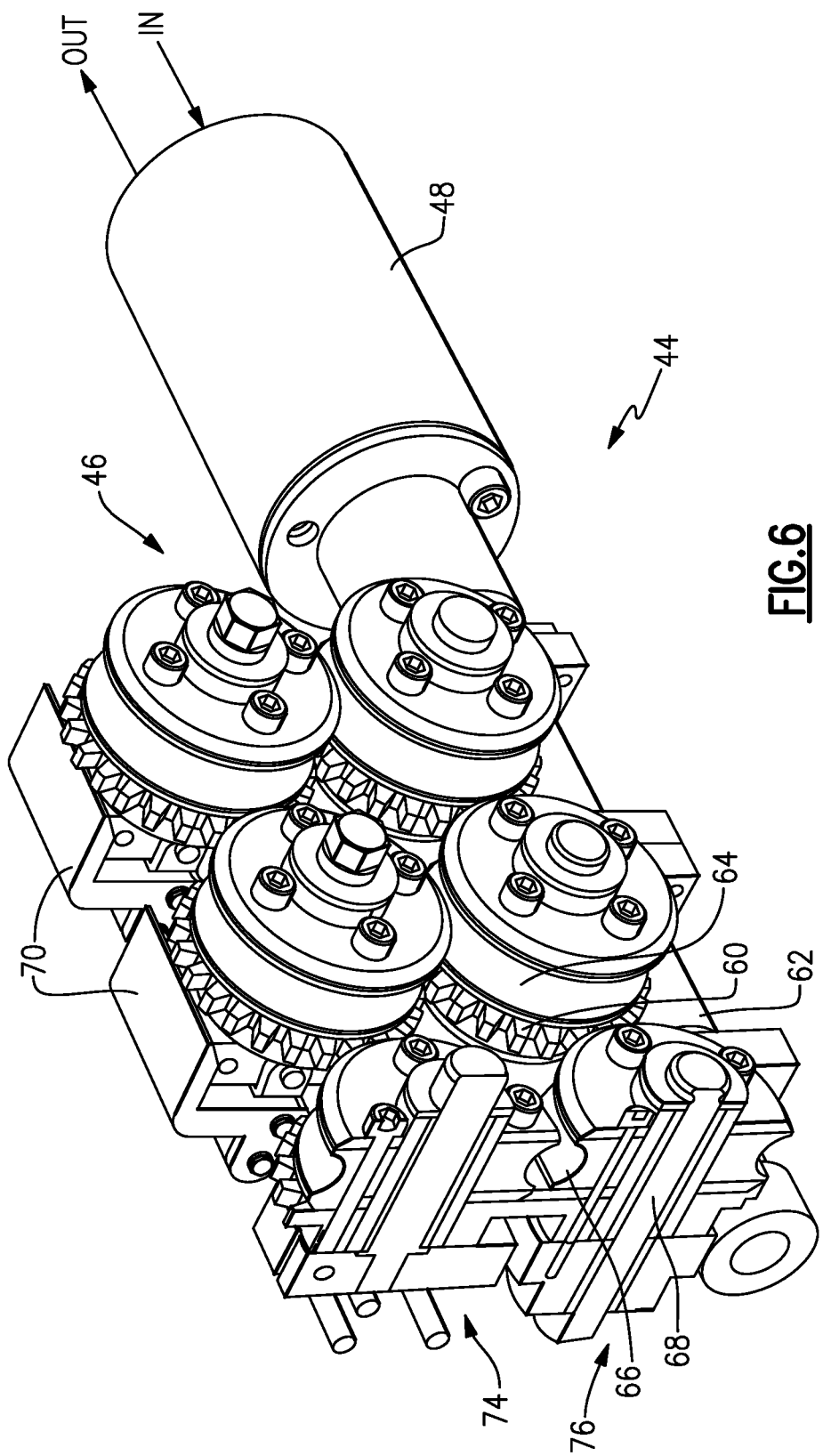
FIG. 6 is a perspective view of the example drive assembly.

Referring to FIGS. 5 and 6, each of the drive assemblies 44 include an upper and lower housing 74, 76 that each support shafts 68 that support drive wheels 64. The drive wheels 64 include a concave shape such that two drive wheels 64 placed adjacent each other form an opening 66 for a cable 58 or hose 56. The opening 66 is sized to provide a frictional fit with the corresponding hose 56 and cable 58. In other words, the drive wheels 66 include a shape that forms the opening 66 of a size that corresponds with the outer diameter of the hose 56 or cable 58 that that specific drive assembly 44 is intended to drive.

The drive wheels 66 include a corresponding gear 60 that is driven by a worm shaft 62. The worm shaft 62 is in turn driven by the motor 48. The example motor 48 is hydraulically driven and therefore receives an input of pressurized hydraulic fluid from a source supported in the support vehicle 26. Adjusting the direction and magnitude of fluid flow to the motor 48 changes the speed and direction in which the drive wheels rotate 64. This in turn drives the hose 56 or cable 58 and thereby the tool 18 that corresponds to that hose 56 or cable 58 out of through the snout 30.

The upper drive wheels 64 are supported in an upper housing 74 and a lower housing 72. The drive wheels 64 within the upper housing are locked in place by a cam lock 70. The cam lock 70 provides for lifting of the drive wheels 64 in the upper housing 74 away from the drive wheels 64 in the lower housing 76 to provide for installation and routing of the desired hose or cable through the drive assembly 44. Once locked on place the cam lock 70 provides a positive lock to maintain the desired frictional interface with the corresponding cable or hose. Each of the drive assemblies 44 are similarly constructed, but for the shape of the drive wheels 64. The shape of the drive wheels 64 is tailored to the outer diameter and shape of the specific driven hose or cable.

Each set of drive wheels 64 are disposed in a common housing 72. Each common housing 72 includes a corresponding one of the upper and lower housings 74 and 76. Each housing 72 is separate and removable from the other common housings 72. In this example, there are three housings 72 provided that are each driven by the same worm shaft 62. However, the modular construction of the common housings 72 provide adaptability such as using two or four or any number of common housings 72 as may be desired. The number of housings 72 could be adjusted to provide additional friction on the hose or cable as may be required for driving each of the tools through the sewer 14.

Rotation of the driven wheels 64 moves the hose or cable that is fit therebetween. Accordingly, each of the tools 18 is driven out of the snout 30 by a corresponding one of the drive assemblies 44. Rotation of the drive wheels 64 causes a corresponding linear movement of the hose or cable from the snout 30 and into the lateral sewer pipe 14. The extent that the specific tool 18 can be driven into the lateral sewer pipe 14 is limited only by the length of the hose or cable.

The disclosed example tools 18 include the water devices 20, 40 for clearing and/or cutting debris within the sewer 14 and cameras 22, 42 for viewing the interior surface and condition of the sewer pipe 14. The specific water tools 22, 24 can include any known type or configuration that is utilized for cleaning and clearing debris from within a sewer pipe. The cameras 22, 42 include a light to illuminate the interior of the sewer pipe and the camera itself to transmit images to a display within the support vehicle.

Operation of the PFM device 10 can be in any desired sequence as each of the tools 18 are individually controllable by actuating the corresponding drive assembly 44. For example, the water tool 22 can be sent into the lateral along with the first camera 22. The length or extend that each is sent into the lateral 14 can be different and controlled from within the support vehicle 26 by controlling the corresponding hydraulic motor 48.

The water tool 20 can then be withdrawn, leaving the camera 22 within the lateral 14. The second water tool 40 can then be extended into the sewer 14 past the camera 22 to further clear debris. As appreciated, the individual control of each of the drive assemblies 44 in each of the different drive modules 28 provides control over the order of operation and the extent that each tool is sent into the lateral. Moreover, although water tools and cameras are shown by way of example, other tools such as measuring tools could also be utilized and operated with the example PFM device 10.

Once a lateral sewer 14 is cleaned as desired, a measurement is required to provide dimensions such as inner diameter and length for fabrication of an appropriate liner. The measurement of the inner diameter is required because in some instances diameters change and vary over the length of the lateral sewer pipe 14. A measuring tool could be included in the PFM device 16 or a separate measurement device could be utilized. If a measurement tool is provided in the PFM device 16, measurements of the pipe diameter and length can be determined without removing the PFM device 16, thereby saving time and man hours.

Figure 7:
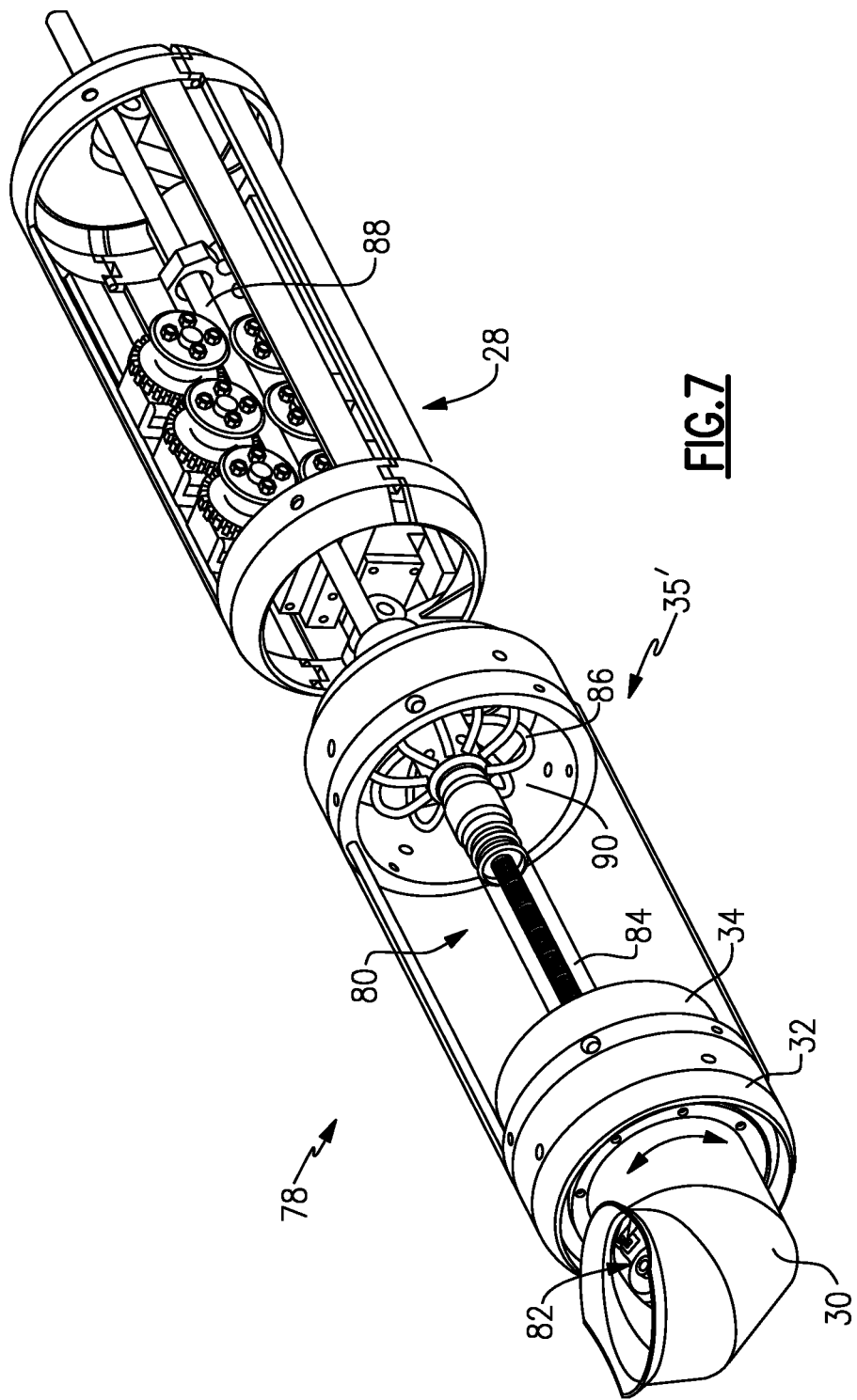
FIG. 7 is a perspective view of an example measure from the main device.

Referring to FIG. 7, a measure from the main (MFM) device 78 that includes a launch head 35' coupled to a driver module 28. An inspection tool 80 is stored within the launch head 35' and includes a camera and light 82 at a forward most end and a measurement head 90 spaced apart and connected to the camera and light 82 by a resilient member 84. The example resilient member 84 is a spring that provides for flexibility that allows guiding through bends in the sewer pipe, while biasing the camera and light 82 into alignment with the measurement head 90. The measurement head 90 includes fingers 86 that expand outward radially into contact with the inner walls of the sewer pipe 14. The distance that the fingers 86 expand radially outward corresponds to the inner diameter of the measured sewer pipe 14.

The MFM device 78 includes only a single drive module 28 because only the measurement tool 80 is present. However, if additional measurement tools or other tools are desired, additional driver modules 28 could be added. The driver module 28 drives the cable 88 that includes the required electrical connections to the camera and light 82 and the measurement head 90 such that images and data are communicated to the support vehicle 26.

In operation, once the PFM device 16 has completed the preparation work in the lateral sewer pipe 14 and is subsequently removed or moved clear of the lateral, the MFM device 78 is inserted and pulled into alignment with the opening of the lateral pipe to be measured. The snout 30 is rotated into alignment and the drive assembly 44 of the driver module 28 drives the cable 88, and thereby the measurement tool 80 into the lateral sewer pipe 14.

The fingers 86 extend into contact with an interior portion of the lateral sewer pipe 14 and transmit data indicative of an inner diameter of the sewer pipe 14. The position of the measurement head 90 is also noted to correspond to the measurement of the inner diameter of the lateral sewer pipe 14. The resulting data provides a layout of the diameters along the entire lateral sewer pipe 14. Once the desired measurements have been obtained, the measurement tool 80 is retracted into the launch head 35, and the MFM device 78 is retrieved from the main sewer pipe 10.

Referring to FIGS. 8-11, the support vehicle 26 includes all the support equipment required to control both the PFM device 16 and the MFM device 78. The example support vehicle 26 includes a PFM side 92, an MFM side 94 and a control console 104. A generator/pump 102 is mounted to the support vehicle 26 to power the electrical devices and to provide the required hydraulic pressure desired to operate the drive assemblies 44. Moreover, the support vehicle 26 includes tanks 1-5 for storing water, and the necessary hydraulic fluid. Water may also be routed through the support vehicle from an external source.

Hydraulic hose reels 96 are provided that hold the hoses that supply hydraulic fluid to the motors 48 of the driver modules. Each of the example hose reels 96 hold a banded 5 conduit hose. Accordingly, the PFM device 16 receives two of the banded 5 conduit hoses from two corresponding reels 96 to provide 10 overall hydraulic conduits to supply controllable hydraulic fluid flow to each of the four drive assemblies 44 and the motor 34 driving rotation of the snout 32. The MFM device 78 requires only one banded 5 conduit hose to drive the one drive assembly 44 and the motor 34 for rotating the snout 30.

Mounted over the hose reels 96 are water hose reels 100 and camera cable hose reels 98. The example PFM side 92 includes two water hose reels 100 for each of the water tools 20 and 40, and two cable reels 98 that include cable to communicate with the cameras 22 and 42. The MFM side 94 includes only a cable reel 98 that provides communication with the measurement tool 80.

Each of the reels 96, 98, and 100 can be driven by a motor to both feed out cable and hose and retrieve cable and hose as required during operation. Each of the reels 96, 98, and 100 may also freely rotate to allow the corresponding drive assembly 44 to move the corresponding tool within the sewer pipe 14. Further, each reel 96, 98 and 100 can be driven in a synchronized manner with the motor 48. Each of the reels 96, 98, and 100 also include a sensor 106 that provides data indicative of the amount of cable or hose that has been played out from the reel. The data from the sensor 106 provides information on the distance within the sewer pipe 14 that a corresponding one of the tools 18 has been extended. Accordingly, using the extended distance from a known location, the distance of a tool from the snout 30, or any location within the sewer pipe 14 can be determined.

The control console 104 includes a display 108 and control devices for controlling hydraulic pressure, water pressure, and operation of the lights and cameras for each of the tools 18. The control console 104 also includes controls that coordinate operation of the reels 96, 98 and 100. Moreover, the display 108 is utilized to provide a visual representation of the controls for both the PFM device 16 and the MFM device 78, and to project images obtained from the various cameras. Therefore, support vehicle 26 includes the controls required to operate and receive data from the PFM device 16 and the MFM device 78.

The disclosed example PFM device 16 and MFM device 78 provide separately controllable equipment for preparing the lateral sewer pipe for lining entirely from the main sewer pipe.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A sewer preparation system comprising:
a plurality of drive modules linked together, each of the drive modules including a drive assembly;
a plurality of control conduits in driving engagement with the drive assembly of a corresponding one of the plurality of drive modules;
a plurality of tools attached to an end of a corresponding one of each of the plurality of control conduits; and
a launch head coupled to the plurality of drive modules, wherein the launch head includes a snout forming passageway for the plurality of tools and a corresponding one of the plurality of control conduits and a space for storing the plurality of tools when not extended outward, wherein the drive assembly of a corresponding one of the plurality of drive modules is actuatable to extend and retract a corresponding one of the plurality tools relative to the launch head.

2. The sewer preparation system as recited in claim 1, including a control assembly governing operation of the drive assembly within each of the plurality of drive modules independently and separately for extending each of the plurality of tools from the launch head into a pipe.

3. The sewer preparation system as recited in claim 1, wherein the snout is rotatable for directing an extended one of the plurality of tools out of the launch head.

4. The sewer preparation system as recited in claim 1, wherein the drive assembly comprise a hydraulic motor.

5. The sewer preparation system as recited in claim 1, wherein the drive assembly comprises opposing drive wheels that frictionally engage and drive a corresponding one of the plurality of control conduits.

6. The sewer preparation system as recited in claim 5, wherein each of the drive modules includes a control conduit guide for directing all of the control conduits through each of the drive modules and one of the control conduits into driving engagement with the drive assembly.

7. The sewer preparation system as recited in claim 1, wherein at least one of the control conduits comprises a hose supplying water at a desired pressure to a corresponding one of the plurality of tools.

8. The sewer preparation system as recited in claim 1, wherein one of the corresponding plurality of tools comprises a cleaning tool for cleaning sewer pipe.

9. The sewer preparation system as recited in claim 1, wherein one of the plurality of tools comprises an inspection head for measuring internal dimensions of a pipe.

10. The sewer preparation system as recited in claim 1, wherein at least one of the corresponding plurality of tools comprises a camera and the corresponding control conduit comprises a cable for communicating information from the camera to a control assembly.

11. The sewer preparation system as recited in claim 10, wherein control assembly includes a plurality corresponding reels for holding and driving each of the plurality of control conduits, wherein each of the reels are controlled for feeding the corresponding control conduit in concert with the operation of the drive assembly of a corresponding one of the drive modules, wherein the drive assembly and reel for a corresponding one of the plurality of control conduits are controlled by the control assembly to maintain a desired tension on the control conduit.

12. The sewer preparation system as recited in claim 1, including a tow device coupled to the plurality of drive modules for moving the drive modules within a pipe.

13. A sewer preparation system comprising:
a first conduit drive module including a first drive assembly;
a second conduit drive module including a second drive assembly, wherein the second conduit drive module is pivotally coupled to the first conduit drive module;
a first tool disposed at an end of a first control conduit, the first control conduit guided through the second conduit drive module and into driving engagement with the first drive assembly within the first drive module;
a second tool disposed at an end of a second control conduit, the second control conduit in driving engagement with the second drive assembly and through the first conduit drive module around the first drive assembly; and
a launch head coupled to the second first conduit drive module, wherein the launch head includes a movable snout for defining a direction for extension of one of the first tool and the second tool into a pipe and a space for storing the first tool and the second tool.

14. The sewer preparation system as recited in claim 13, including a first guide bracket disposed within the first conduit drive module and a second guide bracket disposed within the second drive module, wherein each of the first guide bracket and the second guide bracket guide a corresponding one of the first control conduit and the second control conduit into engagement with a corresponding one of the first drive assembly and the second drive assembly.

15. The sewer preparation system as recited in claim 14, wherein the first guide bracket and the second guide bracket route a non-driven one of the first control conduit and the second control conduit around a corresponding one of the first drive assembly and the second drive assembly.

16. The sewer preparation system as recited in claim 13, wherein the first tool comprises a water device for clearing debris and the first control conduit comprises a hose supplying water at a desired pressure to the water device.

17. The sewer preparation system as recited in claim 13, wherein the second tool comprises a camera and the second control conduit comprises a cable for communicating information from the camera to a control assembly.

18. The sewer preparation system as recited in claim 13, including at least one additional conduit drive module including an additional drive assembly and an additional tool and control conduit corresponding to each additional conduit drive module, wherein each of the additional tools are stored within the launch head and the additional control conduit is guided through each of the first conduit drive module, the second conduit drive module and any of the at least one additional drive modules.

19. The sewer preparation system as recited in claim 13, including a control assembly comprising a plurality corresponding reels for holding and driving each of the first and second control conduits, wherein each of the reels are controlled for feeding the corresponding control conduit in concert with the operation of the drive assembly of a corresponding one of the drive modules, wherein the drive assembly and reel for a corresponding one of the first and second control conduits are controlled by the control assembly to maintain a desired tension on the control conduit.

* * * * *